United States Patent [19]

Hirota et al.

[11] Patent Number: 4,486,789

[45] Date of Patent: Dec. 4, 1984

[54] MAGNETIC RECORDING AND/OR REPRODUCING APPARATUS

[75] Inventors: Akira Hirota, Chigasaki; Yoshihiko Ota, Yokohama, both of Japan

[73] Assignee: Victor Company of Japan, Ltd., Yokohama, Japan

[21] Appl. No.: 358,300

[22] Filed: Mar. 15, 1982

[30] Foreign Application Priority Data

Mar. 16, 1981 [JP] Japan .................................. 56-37675

[51] Int. Cl.³ .............................................. H04N 9/491
[52] U.S. Cl. .................................... 358/330; 358/323; 360/10.3; 360/33.1
[58] Field of Search ............... 358/323, 330; 360/19.1, 360/20, 21, 33.1, 10.3, 77

[56] References Cited

U.S. PATENT DOCUMENTS

| | | |
|---|---|---|
| 3,665,118 | 5/1972 | Cooper, Jr. . |
| 3,845,500 | 10/1974 | Hart ..................................... 360/77 |
| 3,846,819 | 11/1974 | Warren . |
| 3,893,163 | 7/1975 | Wessels et al. . |
| 4,011,587 | 3/1977 | Arter et al. ............................ 360/77 |
| 4,225,889 | 9/1980 | Yabu et al. . |
| 4,303,950 | 12/1981 | Taniguchi et al. .................. 360/10.3 |
| 4,390,906 | 6/1983 | Furumoto et al. .................. 360/33.1 |

FOREIGN PATENT DOCUMENTS

| | | |
|---|---|---|
| 27617 | 10/1980 | European Pat. Off. . |
| 1947741 | 9/1969 | Fed. Rep. of Germany . |
| 2305463 | 2/1973 | Fed. Rep. of Germany . |
| 2503972 | 1/1975 | Fed. Rep. of Germany . |
| 2921892 | 5/1979 | Fed. Rep. of Germany . |
| 3136097 | 11/1981 | Fed. Rep. of Germany . |
| 2240593 | 7/1974 | France . |
| 2501888 | 3/1982 | France . |
| 1193024 | 3/1968 | United Kingdom . |

Primary Examiner—Richard Murray
Attorney, Agent, or Firm—Louis Bernat

[57] ABSTRACT

A magnetic recording and reproducing apparatus comprises a recording and reproducing circuit for recording and reproducing a video signal, an audio signal, and a control signal, so that a region exists on a magnetic tape wherein the video signal, the audio signal, and the control signal are all recorded.

9 Claims, 16 Drawing Figures

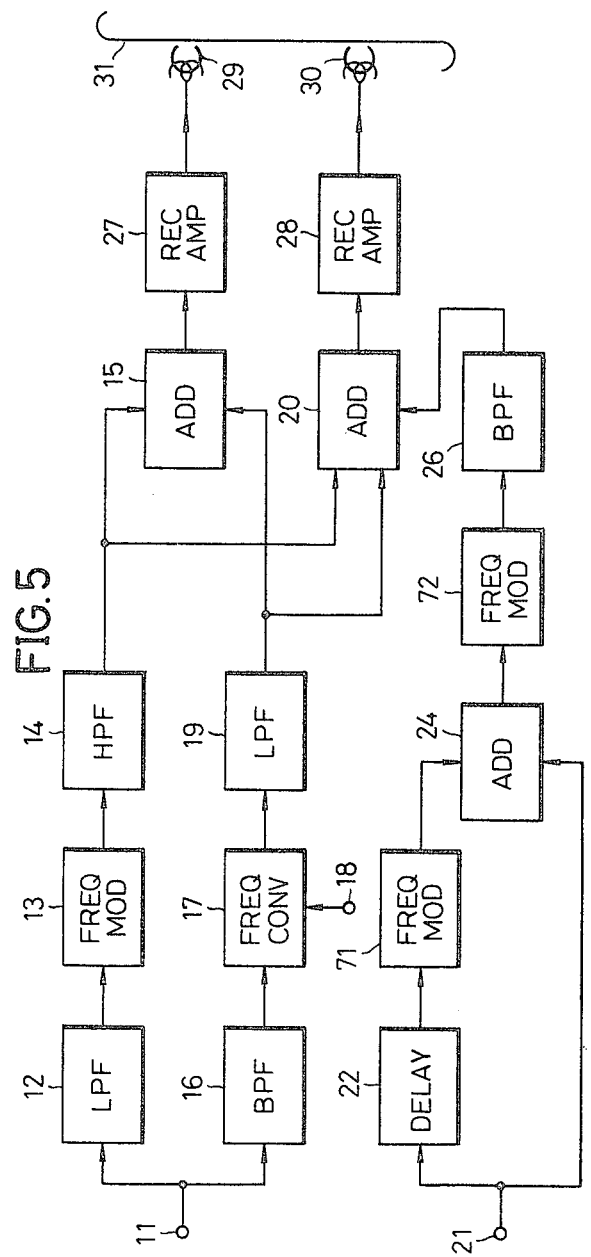
FIG. 5
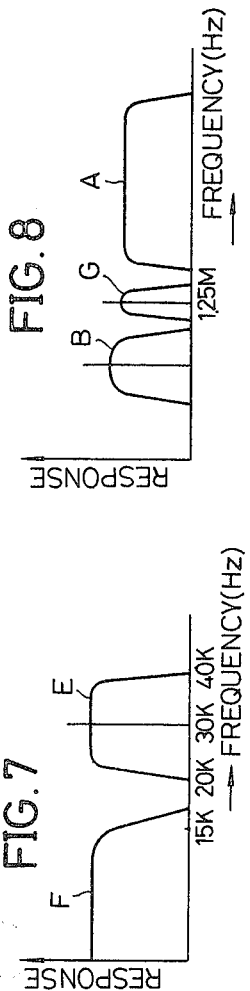
FIG. 8
FIG. 7

MAGNETIC RECORDING AND/OR REPRODUCING APPARATUS

BACKGROUND OF THE INVENTION

The present invention generally relates to magnetic recording and/or reproducing apparatuses, and more particularly to a magnetic recording and/or reproducing apparatus which performs recording and/or reproduction with respect to a magnetic tape so that the magnetic tape has a part where a video signal, an audio signal, and a control signal are all recorded.

In a conventional video signal magnetic recording and/or reproducing apparatus, the video signal is recorded on a track which is oblique with respect to the longitudinal direction of the magnetic tape by use of rotary heads, the audio signal is recorded along the longitudinal direction of the magnetic tape on one end edge of the tape by a fixed head, and the control signal is recorded along the longitudinal direction of the magnetic tape on the other end edge of the tape by a fixed head, and these signals are reproduced upon reproduction. Accordingly, the conventional magnetic recording and/or reproducing apparatus had various disadvantages described below.

(1) The utilization efficiency of the magnetic tape is low, since the video signal, the audio signal, and the control signal are respectively recorded on tracks exclusively for these signals.

(2) The number of parts required is large, since the video, audio, and control signals are respectively recorded and reproduced by magnetic heads exclusively for these signals. Moreover, the travelling path of the magnetic tape is restricted by the positions of the fixed heads.

(3) The audio and control signals are respectively recorded on edges of the magnetic tape. However, fine recording and reproduction cannot be performed with respect to the edges of the magnetic tape, because the magnetic surface at the edges of the magnetic tape is easily damaged, and moreover, due to expansion and contraction at the edges of the magnetic tape, unevenness of the travelling surface at the edges of the magnetic tape, and the like. Especially when dropouts are introduced in the control signal, this may cause a very serious problem in the control system.

(4) The recording and reproducing characteristics are determined by the travelling speed of the magnetic tape, since the audio signal is recorded by the fixed head. The degradation introduced in the reproduced sound quality becomes conspicuous, especially when the format of the apparatus is set to drive the magnetic tape at a low speed.

The above disadvantages (1) through (4) give rise to serious problems when an attempt is made to miniaturize the magnetic recording and/or reproducing apparatus, to perform recording and/or reproduction with respect to a miniaturized magnetic tape cassette in order to record and/or reproduce the video, audio, and control signals with high efficiency and characteristics.

SUMMARY OF THE INVENTION

Accordingly it is a general object of the present invention to provide a novel and useful magnetic recording and/or reproducing apparatus in which the above described disadvantages have been overcome.

Another and more specific object of the present invention is to provide a magnetic recording and/or reproducing apparatus which performs recording and/or reproduction with respect to a magnetic tape so that the magnetic tape has a part where a video signal, an audio signal, and a control signal are all recorded. According to the apparatus of the present invention, the above three signals do not have tracks exclusively for themselves as in the conventional apparatus. Thus, the above described disadvantages (1) through (4) are eliminated, to improve the utilization efficiency of the magnetic tape.

Still another object of the present invention is to provide a magnetic recording and/or reproducing apparatus in which the control signal is recorded in a region on the magnetic tape used for a video track by a fixed head, and the video and audio signals are recorded on a track which is oblique with respect to the longitudinal direction of the magnetic tape by rotary heads. According to the apparatus of the present invention, the audio and control signals are not recorded on the edges of the magnetic tape as in the conventional apparatus. Hence, the above described disadvantage (3) is eliminated. Furthermore, since the audio signal is recorded and reproduced by the rotary heads, the above described disadvantage (4) is accordingly eliminated.

Another object of the present invention is to provide a magnetic recording and/or reproducing apparatus in which the video signal and the audio signal are recorded on a track which is oblique with respect to the longitudinal direction of the magnetic tape by rotary heads, and the control signal is recorded along the full width of the magnetic tape by a control head unitarily assembled within an erasing head which performs erasure of signals recorded on the magnetic tape. In the conventional apparatus, the audio head for the audio signal and the control head for the control signal were unitarily assembled as a fixed head, and provided separately from the full width erasing head and the rotary heads. However, in the apparatus according to the present invention, the above fixed head for audio and control signals can be eliminated. Accordingly, the number of parts required is reduced, and the space for providing the fixed head can be omitted. Thus, the degree of freedom of the tape travelling path is increased, and the above described disadvantage (2) is eliminated. This is especially effective when miniaturizing the apparatus.

Other objects and further features of the present invention will be apparent from the following detailed description when read in conjunction with the accompanying drawings.

BRIEF DESCRIPTION OF THE DRAWINGS

FIGS. 5 and 6 are systematic block diagrams respectively showing a recording system and a reproducing system for a video signal and an audio signal, of a second embodiment of a recording and/or reproducing apparatus according to the present invention;

FIGS. 7 and 8 respectively show frequency spectrums of signals at each part of the block system shown in FIG. 5;

DETAILED DESCRIPTION

Description will be given with respect to each embodiment of recording and reproducing systems for a video signal and an audio signal, of a magnetic recording and/or reproducing apparatus according to the present invention, by referring to FIGS. 1 through 12(A) to 12(J).

Figure 1:
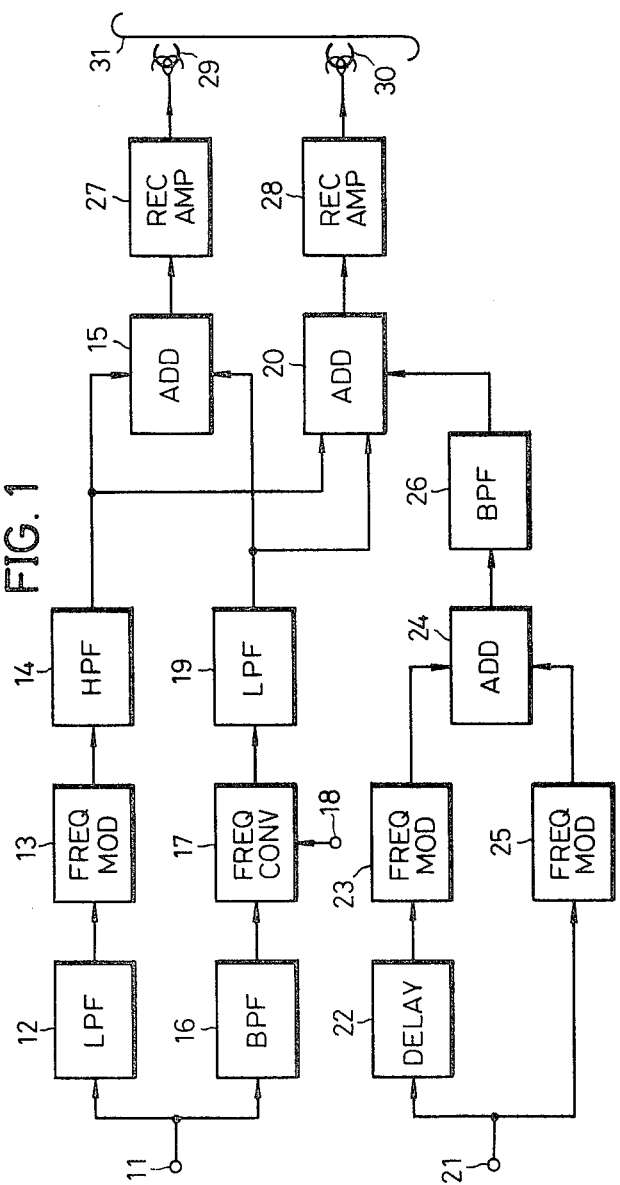
FIGS. 1 and 2 are systematic block diagrams respectively showing a recording system and a reproducing system for a video signal and an audio signal, of a first embodiment of a recording and/or reproducing apparatus according to the present invention
Figure 3:
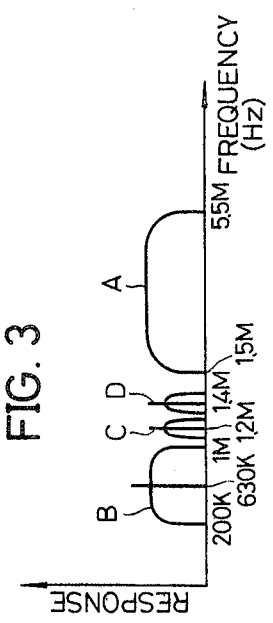
FIG. 3 shows a frequency spectrum of a signal recorded by the recording system shown in FIG. 1.

First, description will be given with respect to an embodiment of a recording system for the video and audio signals of a recording and/or reproducing apparatus according to the present invention by referring to FIG.1. A color video signal indicated in FIG.4(A) which is applied to an input terminal 11, is supplied to a lowpass filter 12 and a bandpass filter 16. The lowpass filter 12 passes signals having frequencies under 3 MHz, while the bandpass filter 16 passes signals in a band between 3 MHz and 4 MHz. A luminance signal within the input color video signal is obtained at the lowpass filter 12, and supplied to a frequency modulator 13 wherein a carrier is frequency-modulated. An output frequency-modulated luminance signal (FM luminance signal) of the frequency modulator 13 is eliminated of its unwanted frequency components at a highpass filter 14 which passes signals having frequencies over 1.5 MHz. Accordingly, a signal having a frequency spectrum indicated by A in FIG. 3, is supplied to an adding circuits 15 and 20. A carrier chrominance signal within the input color video signal is obtained at the bandpass filter 16, and supplied to a frequency converter 17. This carrier chrominance signal is frequency-converted into a low band by a frequency converting signal supplied from a terminal 18. An output frequency-converted carrier chrominance signal thus obtained, is eliminated of unwanted frequency components at a lowpass filter 19 which passes signals having frequencies under 1 MHz. Hence, a signal having a frequency spectrum indicated by B in FIG. 3 is suuplied to the adding circuits 15 and 20.

On the other hand, an audio signal is supplied to a one-field delay circuit 22 and a frequency modulator 25, through an input terminal 21. The delay circuit 22 comprises delay elements such as bucket brigade devices (BBDs) and the like, and delays the audio signal by an interval corresponding to one field of the video signal (1/60 seconds, that is, approximately 16.7 miliseconds). If the input audio signal from the terminal 21 is designated by reference characters I, II, III, IV, ... for every one field as indicated in FIG. 4(B), an output signal of the delay circuit 22 becomes a signal indicated by reference characters Ia, IIa, IIIa, ... as indicated in FIG. 4(C). Here, the signal indicated by a reference character with a subscript "a" is a signal obtained by delaying the same signal in each field interval by one field interval.

The output signal Ia, IIa, IIIa, ... of the delay circuit 22 is supplied to a frequency modulator 23, to frequency-modulate a carrier having a frequency of 1.2 MHz. Accordingly, a frequency-modulated delayed audio signal (FM delayed audio signal) indicated by C in FIG. 3 is obtained, wherein the FM delayed audio signal has a frequency deviation of ±25 kHz about a frequency of 1.2 MHz. This FM delayed audio signal is supplied to an adding circuit 24. The audio signal I, II, III, ... supplied to the frequency modulator 25 from the input terminal 21, frequency-modulates a carrier having a frequency of 1.4 MHz. As a result, a frequency-modulated audio signal (FM audio signal) indicated by D in FIG.3 which has a frequency deviation of ±25 kHz about a frequency of 1.4 MHz is obtained, and supplied to the adding circuit 24. The above FM delayed audio signal and the FM audio signal are added and multiplexed at the adding circuit 24. This added and multiplexed signal is eliminated of its unwanted frequency components at a bandpass filter 26 having a filtering band between 1 MHz and 1.5 MHz, and then supplied to the adding circuit 20.

The FM luminance signal and the frequency-converted carrier chrominance signal from the filters 14 and 19 respectively having the frequency spectrums indicated by A and B in FIG.3 are added at the adding circuit 15, and recorded onto a magnetic tape 31 by a rotary head 29 for a first channel, through a recording amplifier 27. The above signals from the filters 14 and 19 are also supplied to the adding circuit 20 wherein these signals are added with the signal from the filter 26. Since the FM delayed audio signal and the FM audio signal respectively having the frequency spectrums indicated by C and D in FIG.3, which are obtained from the filter 26 after being added and multiplexed, respectively exist between the above frequency spectrums A and B, the band of each signal will not overlap with the band of another signal. Since the recording and reproduction is performed so that the FM delayed audio signal and the FM audio signal are in the above band, the recording and reproduction sensitivity is high. Further, the mutual interference is small because there is little effect due to the harmonic components. An output signal of the adding circuit 20 is recorded onto the magnetic tape 31 by a rotary head 30 for a second channel, through a recording amplifier 28. The above rotary heads 29 and 30 are provided at positions opposing each other, along a diametrical direction of a rotary body such as a rotary drum.

An interval recorded by the head 29 is indicated in FIG. 4(D) while an interval recorded by the head 30 is indicated in FIG. 4(E). Since the magnetic tape 31 is wound around the guide drum throughout the angular range slightly larger than 180° as described above, an interval (overlap interval) exists wherein recording is simultaneously performed by the heads 29 and 30. As clearly seen by comparing FIGS. 4(D) and 4(E), the interval wherein the recording interval overlaps timewise, is the above overlap interval. The heads 29 and 30 have gaps with mutually opposite azimuth angles. Accordingly even when the heads 29 and 30 respectively scan over the tracks recorded by the heads 30 and 29 (socalled reverse tracking), the track recorded by the other head will hardly be reproduced due to azimuth loss. Hence, it will be unnecessary to provide a guard band between each track and the tape utilization efficiency is improved.

As described above, the heads 29 and 30 alternately record on oblique tracks with respect to a longitudinal direction of the magnetic tape 31. Thus, the tracks recorded by the head 29 are mutually adjacent to the tracks recorded by the head 30. The tracks recorded with the FM audio signal and the FM delayed audio signal (that is, the tracks recorded by the head 30), are always adjacent to the track wherein these signals are not recorded (that is, the tracks recorded by the head 29). Therefore, with respect to the audio signal, cross talk will not be introduced between adjacent tracks.

Figure 2:
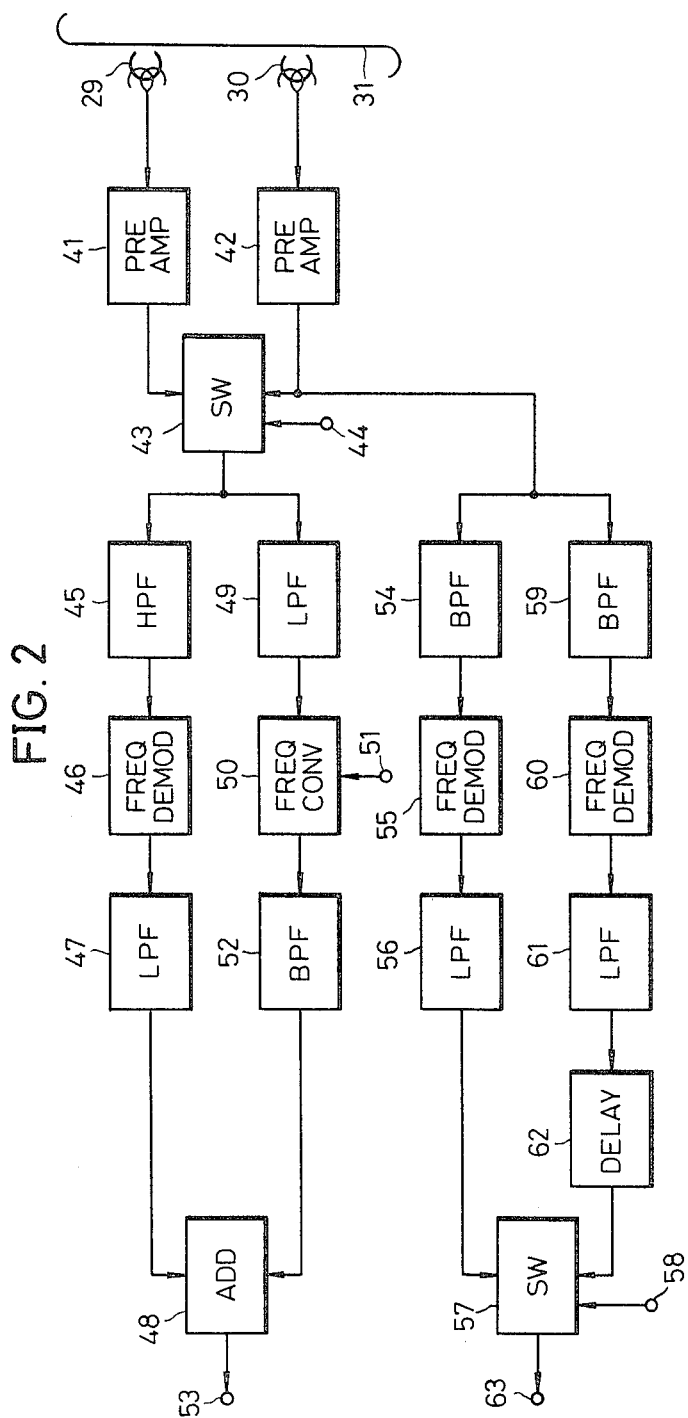
Figure 4:
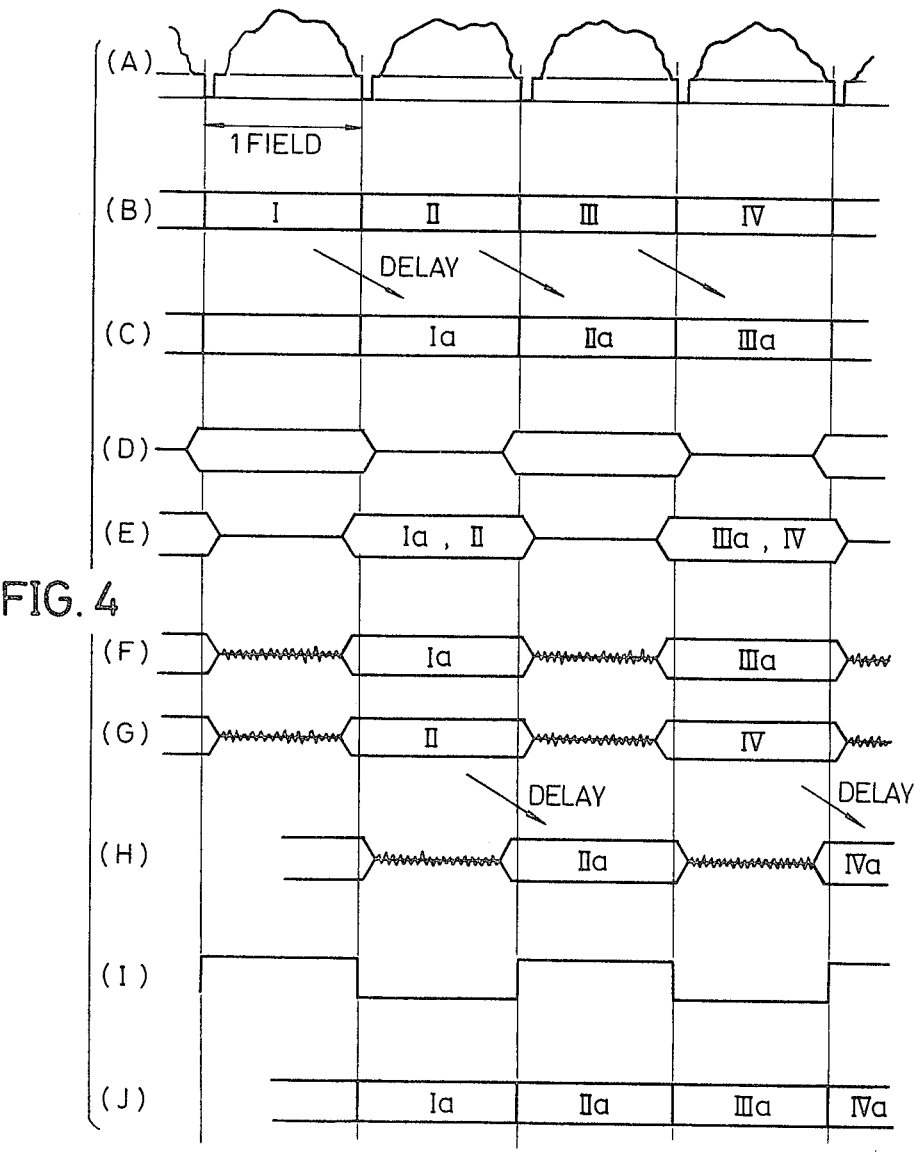
FIGS. 4(A) through 4(J) respectively show signals at each part of the block systems shown in FIGS. 1 and 2, for explaining positions of these signals on the time base.

Description will now be given with respect to a reproducing system for reproducing the magnetic tape 31 recorded in the above described manner, by referring to FIG. 2.

Signals which are alternately reproduced from the magnetic tape 31 by the heads 29 and 30, are respectively supplied to a switcher 43, through preamplifiers 41 and 42. As will be described hereinafter, the heads 29 and 30 are controlled by a control signal recorded on the magnetic tape 31 so that the heads 29 and 30 respectively scan over the tracks recorded by these heads 29 and 30, without introducing the above reverse tracking. The signals alternately supplied to the switcher 43 are switched by a switching signal having a period of one field and applied to the switcher 43 through a terminal 44. The signals alternately supplied to the switcher 43 is thus formed into a continuous signal.

An output signal of the switcher 43 is supplied to a highpass filter 45 and a lowpass filter 49. The highpass filter 45 has a filtering characteristic for passing signals having frequencies over 15 MHz, and the FM luminance signal having the frequency spectrum A is obtained at this highpass filter 45. This FM luminance signal thus obtained, is demodulated at a frequency demodulator 46. An output luminance signal of the frequency demodulator 46 is eliminated of its unwanted frequency components at a lowpass filter 47 which passes signals having frequencies under 3 MHz, and then supplied to an adding circuit 48. The lowpass filter 49 has a filtering characteristic for passing signals having frequencies under 1 MHz, and the frequency-converted carrier chrominance signal having the frequency spectrum B is obtained at this lowpass filter 49. An output signal of the lowpass filter 49 is supplied to a frequency converter 50 wherein the signal is frequency-converted by a frequency converting signal supplied to the frequency converter 50 through a terminal 51, and converted back into the carrier chrominance signal in the original band. An output carrier chrominance signal of the frequency converter 50 is eliminated of its unwanted frequency components at a bandpass filter 52 which passes signals in a band between 3 MHz and 4 MHz, and then supplied to the adding circuit 48. The luminance signal and the carrier chrominance signal are added in the adding circuit 48, and as a result, a reproduced color video signal is obtained from an output terminal 53.

On the other hand, the reproduced signal from the rotary head 31 for the second channel which is obtained through the preamplifier 42, is also supplied to bandpass filters 54 and 59. The bandpass filter 54 has a filtering characteristic for passing signals in a band of 1.2 MHz ±25 kHz, and the FM delayed audio signal having the frequency spectrum C is obtained at this bandpass filter 54. This FM delayed audio signal is demodulated at a frequency demodulator 55, and formed into a delayed signal Ia, IIIa, ... indicated in FIG. 4(F) which exists for every second field. An output delayed audio signal of the frequency demodulator 55 is eliminated of its unwanted frequency components at a lowpass filter 56 which passes signals having frequencies under 15 kHz, and then supplied to a switcher 57.

The bandpass filter 59 has a filtering characteristic for passing signals in a band of 1.4 MHz ±25 kHz, and the FM audio signal having the frequency spectrum D is obtained at this bandpass filter 59. This FM audio signal is demodulated at a frequency demodulator 60, and formed into an audio signal indicated in FIG. 4(G). This output audio signal is eliminated of its unwanted frequency components at a lowpass filter 61 which passes signals having frequencies under 15 kHz, and supplied to a one-field delay circuit 62 wherein the signal is delayed by an interval of one field. Accordingly, as indicated in FIG. 4(H), the delayed audio signal IIa, IVa, ... obtained by delaying the audio signal II, IV, ... indicated in FIG. 4(G) by an interval of one field, are obtained for every second field from the delay circuit 62. This delayed audio signal is supplied to the switcher 57.

The switcher 57 is applied with a switching signal indicated in FIG. 4(I) which reverses polarity for every one field period, through a terminal 58. The switcher 57 thus performs a switching operation to alternately produce the delayed audio signal Ia, IIIa, ... indicated in FIG. 4(F) from the lowpass filter 56 and the delayed signal IIa, IVa, ... indicated in FIG. 4(H) from the delay circuit 62, for every one field period. Accordingly, a continuous delayed audio signal Ia, IIa, IIIa, IVa, ... indicated in FIG. 4(J) is thus obtained from an output terminal 63 as a reproduced audio signal. The above reproduced audio signal obtained from the output terminal 63 is delayed by an interval of one field (1/60 seconds) with respect to the reproduced color video signal obtained from the output terminal 53. However, a delay to this extent does not become a problem from the auditory point of view, and no inconveniences are introduced.

Next, description will be given with respect to a recording system for the video and audio signals, of a second embodiment of a recording and/or reproducing apparatus according to the present invention, by referring to FIG. 5. In FIG. 5, those parts which are the same as those corresponding parts in FIG. 1 are designated by the same reference numerals, and their description will be omitted. A recording system for an input color video signal indicated in FIG. 9(A) is the same as in the above first embodiment of the invention, and the description of this recording system for the color video signal will be omitted.

An audio signal I, II, III ... indicated in FIG. 9(B) which is obtained from the input terminal 9(B), is delayed by an interval of one field by the one field delay circuit 22 as in the above first embodiment of the invention, and converted into a delayed audio signal Ia, IIa, IIIa, ... indicated in FIG. 9(C). This delayed audio signal is supplied to a frequency modulator 71 to frequency-modulate a carrier of 30 kHz, and then supplied to the adding circuit 24 after being converted into an FM delayed audio signal having a frequency deviation of ±10 kHz about a frequency of 30 kHz. On the other hand, the audio signal from the input terminal 21 is directly supplied to the adding circuit 24, where it is added and multiplexed with the above FM delayed audio signal to be formed into a signal indicated in FIG. 9(D). The above FM delayed audio signal has a frequency spectrum indicated by E in FIG. 7, and the audio signal from the input terminal 21 has a frequency spectrum indicated by F in FIG. 7.

The multiplexed audio signal of the frequency spectrums indicated by E and F in FIG. 7, which is obtained from the adding circuit 24, is supplied to a frequency modulator 72. The above multiplexed audio signal frequency-modulates a carrier having a frequency of 1.25 MHz, and is formed into an FM multiplexed audio signal having a frequency deviation of ±25 kHz about a frequency of 1.25 MHz. An output FM multiplexed audio signal from the frequency modulator 72 has a frequency spectrum indicated by G in FIG. 8. This FM multiplexed audio signal passes through the bandpass filter 26, the adding circuit 20, and the recording amplifier 28, and is recorded by the head 30 for the second channel together with the video signal for every second track. As shown in FIGS. 9(E) and 9(F), the recording intervals of the heads 29 and 30 are the same as in the above described first embodiment of the invention.

Description will now be given with respect to a reproducing system for reproducing the magnetic tape 31 recorded in the above described manner, by referring to FIG. 6. In FIG. 6, those parts which are the same as those corresponding parts in FIG. 2 are designated by the same reference numerals, and their description will be omitted. The reproducing system for the video signal is the same as in the above described first embodiment of the invention, and its description will be omitted.

Figure 8:
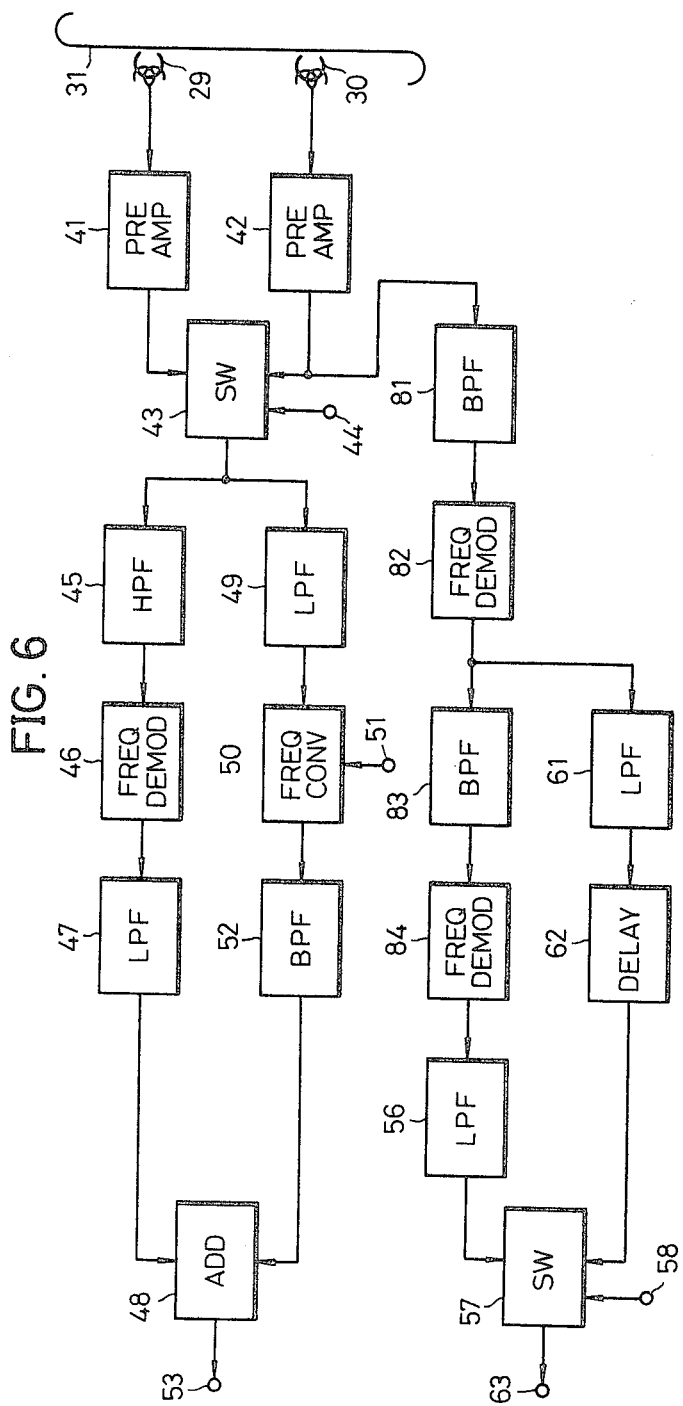
Figure 9:
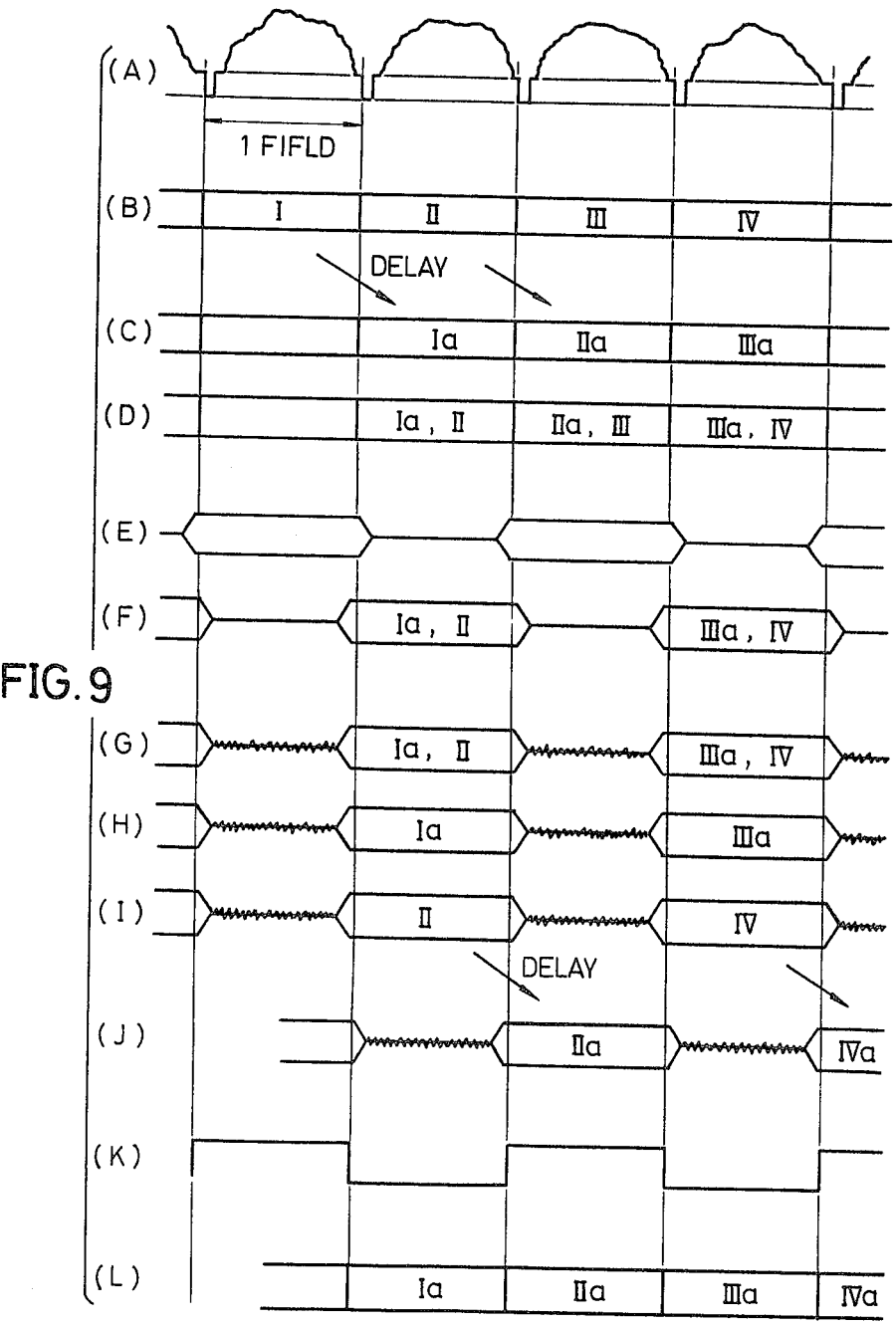
FIGS. 9(A) through 9(L) respectively show signals at each part of the block systems shown in FIGS. 5 and 6, for explaining positions of these signals on the time base.

The signal reproduced by the second-channel head 30 is supplied to the switcher 43 through the preamplifier 42, and also supplied to a bandpass filter 81. The bandpass filter 81 has a passing band between 1 MHz and 1.5 MHz, and the FM multiplexed audio signal indicated by G in FIG. 8 is thus obtained at this bandpass filter 81. The FM multiplexed audio signal thus obtained is demodulated at a frequency demodulator 82, and restored to the signal in the original frequency spectrum indicated in FIG. 7. This demodulated signal is supplied to a bandpass filter 83 and the lowpass filter 61. The demodulated multiplexed audio signal exists in a manner indicated in FIG. 9(G).

The bandpass filter 83 has a filtering band between 20 kHz and 40 kHz, and the FM delayed audio signal indicated in FIG. 7 is obtained at this bandpass filter 83. The above FM delayed audio signal is demodulated at a frequency demodulator 84, and converted into a delayed audio signal Ia, IIIa, ... indicated in FIG. 9(H). This delayed audio signal is supplied to the switcher 57 through the lowpass filter 56. On the other hand, the audio signal indicated by F in FIG. 7, that is the audio signal II, IV, ... indicated in FIG. 9(I) which is not delayed, is obtained at the lowpass filter 61. This audio signal II, IV, ... is delayed by an interval of one field at the one-field delay circuit 62, and converted into a delayed audio signal IIa, IVa, ... indicated in FIG. 9(J). This delayed audio signal is supplied to the switcher 57.

The delayed audio signal Ia, IIIa, ... from the lowpass filter 56 and the delayed audio signal IIa, IVa, ... from the delay circuit 62 are switched at the switcher 57 according to a switching signal indicated in FIG. 9(K), and formed into a continuous delayed audio signal Ia, IIa, IIIa, IVa, ... indicated in FIG. 9(L). This continuous delayed audio signal is obtained from the output terminal 63.

Figure 10:
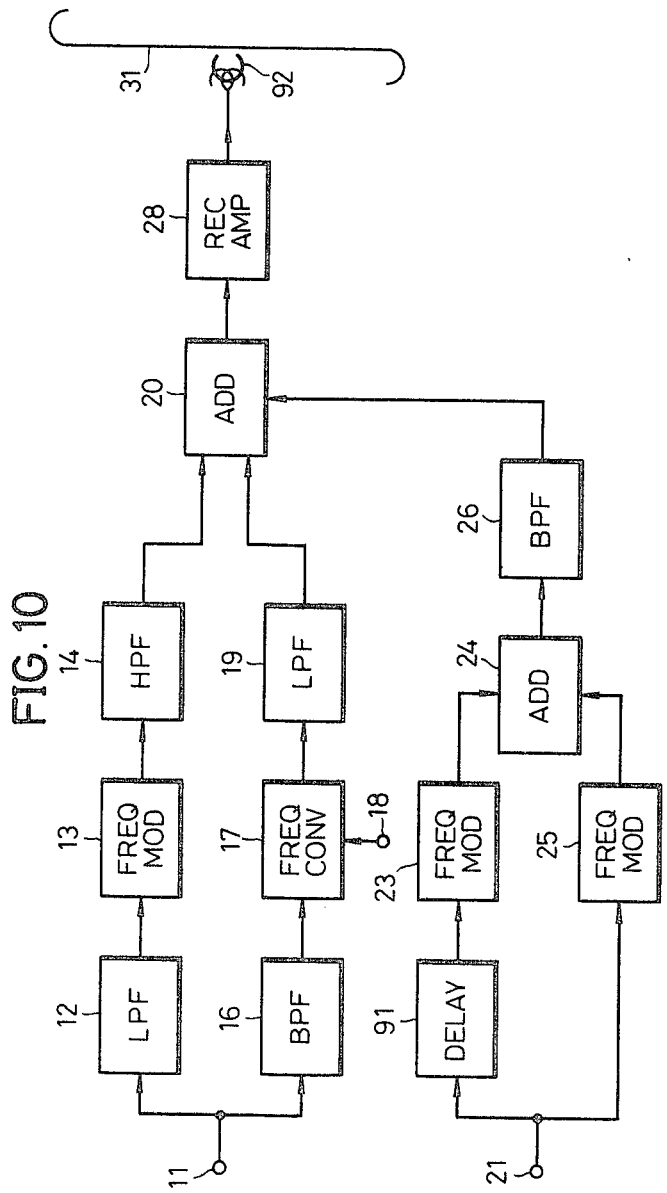
FIGS. 10 and 11 are systematic block diagrams respectively showing a recording system and a reproducing system for a video signal and an audio signal, of a third embodiment of a recording and/or reproducing apparatus according to the present invention.

Next, description will be given with respect to a recording system for the video and audio signals, of a third embodiment of a recording and/or reproducing apparatus according to the present invention, by referring to FIG. 10. In FIG. 10, those parts which are the same as those corresponding parts in FIG. 1 are designated by the same reference numerals, and their description will be omitted.

A color video signal indicated in FIG. 12(A) which is applied to the input terminal 11, is subjected to a similar signal processing as in the above first embodiment of the invention. The FM luminance signal A indicated in FIG. 3 which is obtained from the highpass filter 14 and the frequency-converted carrier chrominance signal B obtained from the lowpass filter 19, are supplied to the adding circuit 20.

On the other hand, the audio signal from the input terminal 21 is delayed by an interval of $\frac{1}{2}$ field at a $\frac{1}{2}$-field delay circuit 91. In FIG. 12(B), the audio signal from the input terminal 21 is shown in a state where the audio signal is divided into intervals of $\frac{1}{2}$ field from a position which is shifted by $\frac{1}{4}$ field from a starting end of one field of the video signal, as I, II, III, IV, .... When this input audio signal is delayed by $\frac{1}{2}$ field at the delay circuit 91, an audio signal Ia, IIa, IIIa, IVa, ... indicated in FIG. 12(C) is accordingly obtained.

The output delayed audio signal of the delay circuit 91 frequency-modulates a carrier at the frequency modulator 23. Hence, the FM delayed audio signal indicated by C in FIG. 3 is obtained and supplied to the adding circuit 24. The input audio signal from the terminal 21 is converted into the FM audio signal indicated by D in FIG. 3 at the frequency modulator 25, and then supplied to the adding circuit 24. The signals C and D (a signal indicated in FIG. 12(D)) added at the adding circuit 24 is supplied to the adding circuit 20 through the bandpass filter 26, and is added with the signals A and B obtained from the filters 14 and 19. The signals A, B, C, and D indicated in FIG. 3 which are added at the adding circuit 20, are supplied to a single rotary head 92 through the recording amplifier 28.

The present embodiment of the invention is an embodiment of a so-called one-head system recording and/or reproducing apparatus. Only the above single rotary head 92 is provided as the rotary body, and the magnetic tape 31 travels in a state where the tape 31 is wound around the guide drum once in a spiral manner. The head 92 records on an oblique track with respect to the longitudinal direction of the magnetic tape 31, as the head 92 makes a full revolution. However, since only a single head is provided, the head 31 always performs a recording operation with respect to the magnetic tape 31, and the head 92 starts to form a succeeding track after forming one track by tracing the upper and lower edges of the tape. Accordingly, in this one-head system recording and reproducing apparatus, an interval DP in which the signal cannot be recorded and reproduced is inevitably introduced with respect to recording and reproducing intervals indicated in FIG. 12(E), when the head 92 traces over the end edge of the magnetic tape 31.

The interval in which the head 92 cannot record and reproduce to introduce signal dropout, is in a range of under approximately 2 miliseconds. Accordingly, it becomes necessary to set the delay time of the above delay circuit 91 in a range between 2 miliseconds and 14 miliseconds. Thus, in the present embodiment of the invention, the delay time of the delay circuit 91 is set to an interval of ½ field, that is, approximately 8.3 miliseconds.

Figure 11:
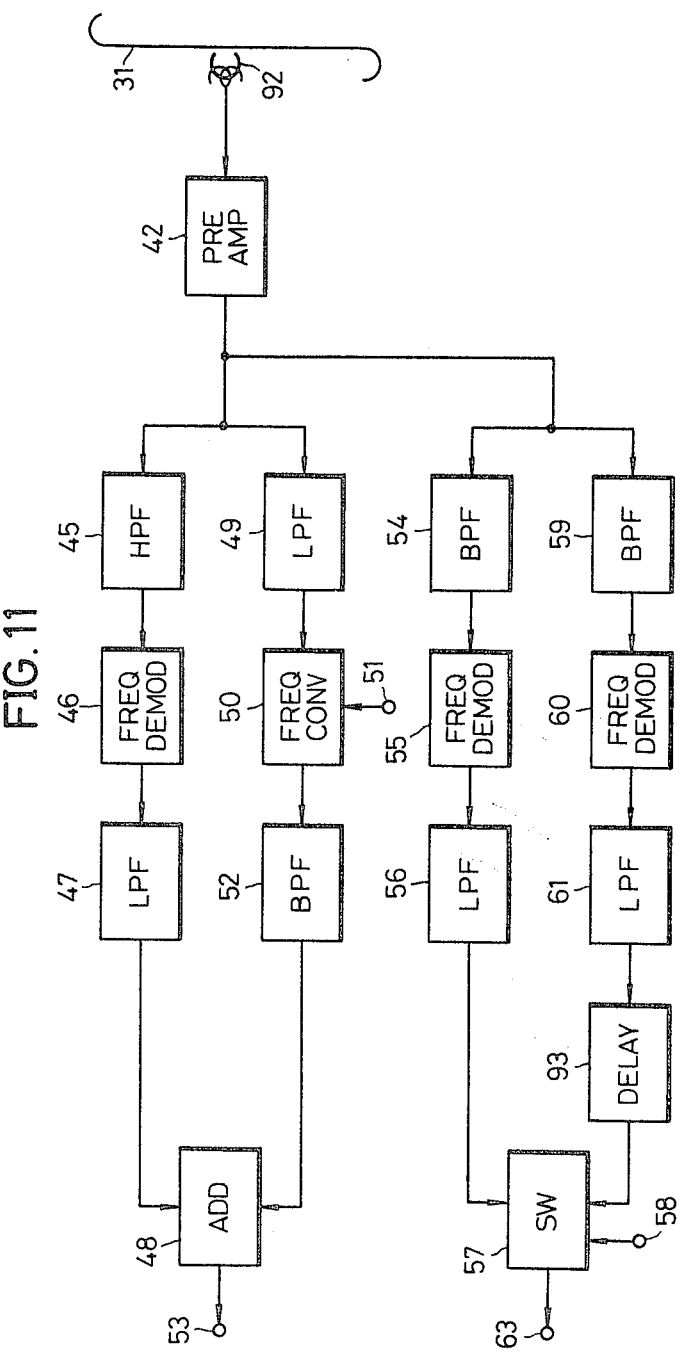
Figure 12:
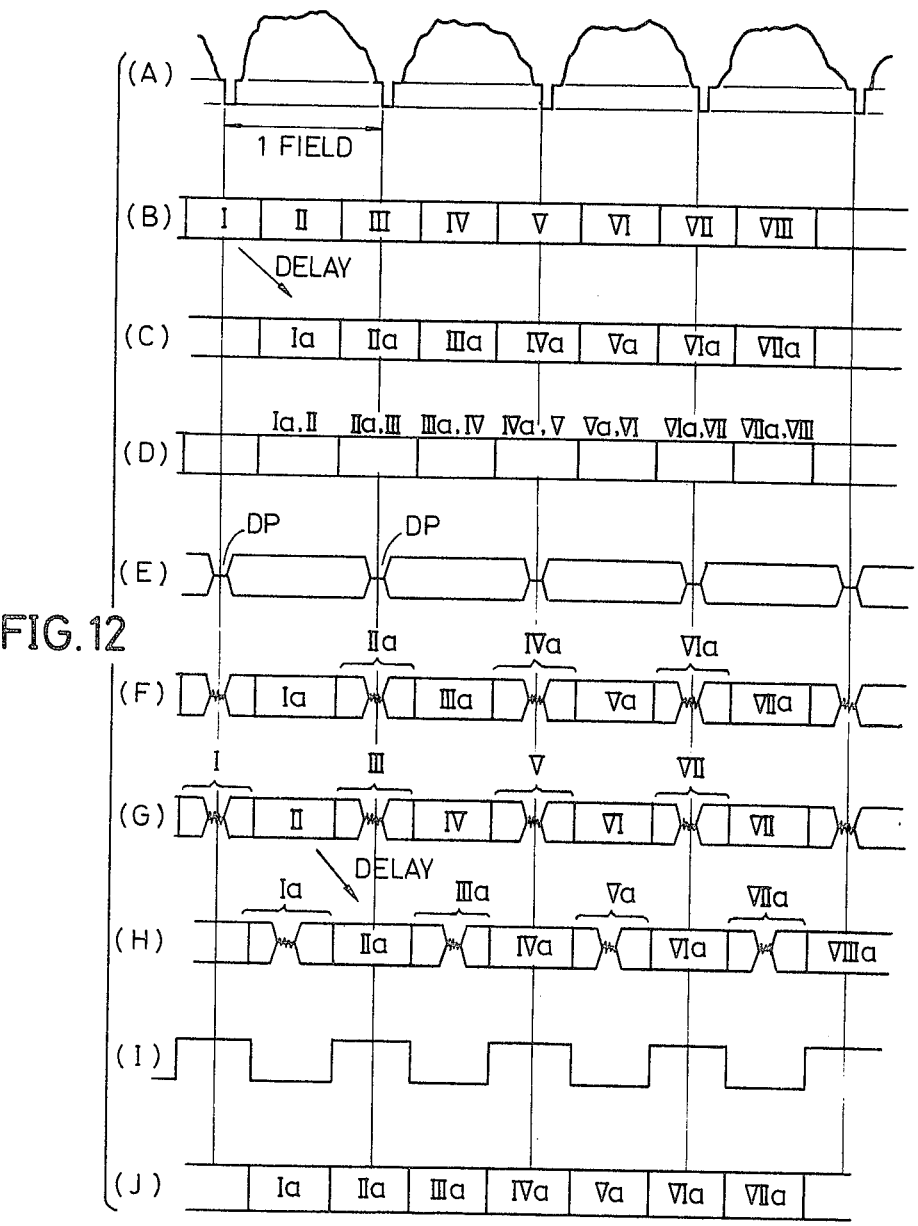
FIGS. 12(A) through 12(J) respectively show signals at each part of the block systems shown in FIGS. 8 and 9, for explaining positions of these signals on the time base.

The magnetic tape 31 recorded in the above described manner, is reproduced by a reproducing system shown in FIG. 11. In FIG. 11, those parts which are the same as those corresponding parts in FIG. 2 are designated by the same reference numerals, and their description will be omitted.

The signal reproduced from the magnetic tape 31 by the head 92, is supplied to the highpass filter 45, and the lowpass filter 49, through the preamplifier 42. The reproduced signal is also supplied to the bandpass filters 54 and 59 through the preamplifier 42. The reproduced color video signal is obtained from the signal supplied to the filters 45 and 49. The signal processing performed until the signal is finally obtained from the output terminal 53, is the same as in the above described first embodiment of the invention. The reproduced color video signal thus obtained from the output terminal 53, is compensated of the above signal dropout by a conventionally known signal dropout compensation circuit (not shown).

The FM delayed audio signal having a center frequency of 1.2 MHz and obtained from the bandpass filter 54, is demodulated at the frequency demodulator 55. The output of the frequency demodulator 55 is supplied to the switcher 57 through the lowpass filter 56. As indicated in FIG. 12(F), this delayed audio signal is complete for signal intervals Ia, IIIa, Va, VIIa, . . . , however, incomplete for signal intervals IIa, IVa, VIa, . . . since signal dropout is introduced when the head 92 traces over the end edge of the magnetic tape 31.

The FM audio signal having a center frequency of 1.4 MHz and obtained from the bandpass filter 59, is demodulated at the frequency demodulator 60. The output of the frequency demodulator 60 is supplied to a ½-field delay circuit 93 through the lowpass filter 93. As indicated in FIG. 12(G), the signal supplied to the above delay circuit 93 is complete for signal intervals II, IV, VI, VIII, . . . , however, incomplete for signal intervals I, III, V, VII, . . . due to signal dropout. This signal indicated in FIG. 12(G) is delayed by an interval of ½ field at the delay circuit 93 and formed into a signal indicated in FIG. 12(H). The signal indicated in FIG. 12(H) is a signal obtained by delaying the entire signal indicated in FIG. 12(G) by an interval of ½ field. Accordingly, signal intervals IIa, IVa, VIa, VIIIa, . . . of the signal indicated in FIG. 12(H) are complete, while signal intervals Ia, IIIa, Va, VIIa, . . . are incomplete. An output signal of the delay circuit 93 supplied to the switcher 57.

The switcher 57 is applied with a switching signal indicated in FIG. 12(I) which reverses polarity for every ½ field, through the terminal 58. The switcher 57 accordingly performs a switching operation for every ½ field, by successively switching complete signal intervals Ia, IIIa, Va, . . . of the signal indicated in FIG. 12(F) which is obtained from the lowpass filter 56, and complete signal intervals IIa, IVa, VIa, . . . of the signal indicated in FIG. 12(H) which is obtained from the delay circuit 93. Therefore, a complete signal indicated by Ia, IIa, IIIa, IVa, . . . in FIG. 12(J), having no signal dropouts, is obtained from the output terminal 63 as the reproduced audio signal.

Figure 13:
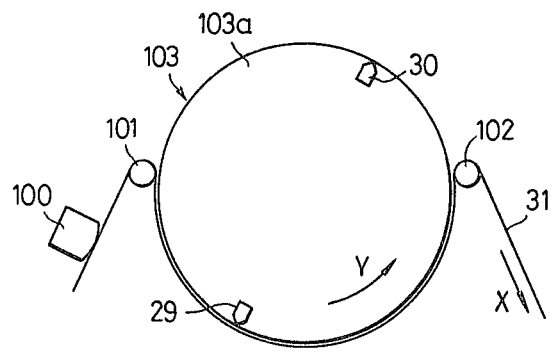
FIG. 13 is a general plan view of a guide drum and parts in the vicinity of the guide drum, for explaining a magnetic head in the recording and/or reproducing apparatus according to the present invention.
Figure 14:
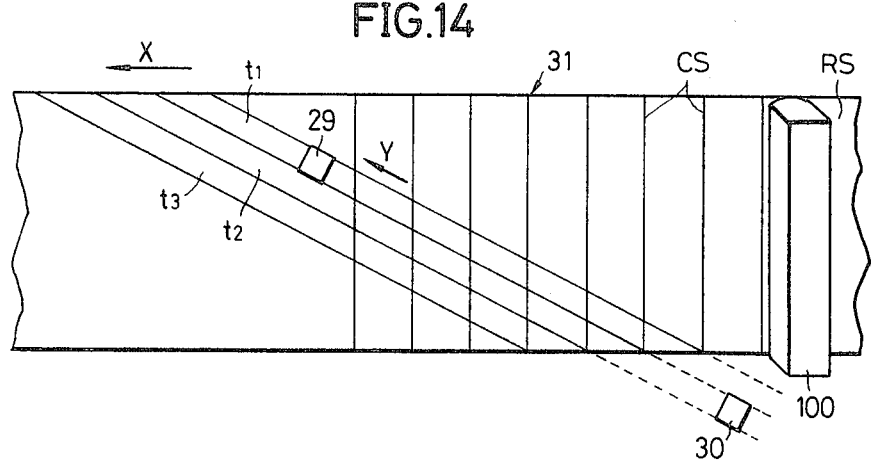
FIG. 14 shows a track pattern on a magnetic tape recorded by the recording and/or reproducing apparatus according to the present invention.

Next, description will be given with respect to the recording and reproducing system for the control signal. As shown in FIG. 13, the magnetic tape 31 first makes contact with a fixed head 100 which will be described hereinafter, and is then obliquely wound around a guide drum 103 throughout a predetermined angular range (a range slightly larger than 180°) in a state restricted by guide poles 101 and 102 to travel in the direction of an arrow X. The above rotary heads 29 and 30 are provided on a rotary drum 103a of the guide drum 103, at positions opposing each other along the diametrical direction of the rotary drum 103a. The fixed head 100 is not necessarily fixedly provided on a chassis. A construction may be employed where the fixed head 100 is fixedly provided on a lever and recedes from the tape travelling path by the rotary movement of the lever, upon loading and unloading of the tape.

The fixed head 100 is provided at a position similar to where the full-width erasing head is provided in the conventional apparatus. In the apparatus according to the present invention, the fixed head 100 functions as the full-width erasing head and the head for recording and reproducing the control signal. The fixed head 100 has a gap extending throughout the full width of the magnetic tape 31. During a recording mode, the fixed head 100 is supplied with a current in which a high-frequency current for erasure and a control signal current are multiplexed. Hence, the fixed head 100 erases the recorded signals on the travelling magnetic tape 31 throughout the full width of the tape, and also records a control signal CS throughout the full width of the magnetic tape 31. During a reproducing mode, the fixed head 100 reproduces the recorded control signal CS. In the conventional recording and/or reproducing apparatus, the control head for the control signal and the audio head for the audio signal were respectively provided at positions beyond the guide pole 102 in the travelling path of the magnetic tape 31. However, in the apparatus according to the present invention, these heads are not provided.

The high-frequency current for erasure which is supplied to the fixed head 100 upon a recording mode, has a frequency of 70 kHz, for example. The high-frequency current has a magnitude sufficient to finely erase the information signal recorded on the magnetic tape 31. Moreover, even when the control signal which is multiplexed with the high-frequency current for erasure and supplied to the fixed head 100 during the recording mode, is reproduced by the rotary heads 29 and 30 upon reproduction, the fundamental frequency is 30 Hz as indicated by H in FIGS. 3 and 8, for example, having a frequency and waveform in a band outside the band used by the rotary heads. If the travelling speed of the magnetic tape 31 is 33 mm/sec and the relative scanning speed of the rotary heads 29 and 30 with respect to the magnetic tape 31 is 5.8 m/sec, the frequency of the control signal recorded on the magnetic tape is reproduced as a frequency $5.8/33 \times 10^{-3}$ times that frequency by the rotary heads. Accordingly, even when it is assumed that the uppermost frequency of the harmonic in the control signal is approximately 200 Hz, this signal will be reproduced by the rotary heads as a signal having a frequency of approximately 35 kHz. Since the lower limit of the band used by the rotary heads is approximately 100 kHz, the control signal will not be reproduced by the rotary heads.

The current of the control signal has a magnitude so as not to introduce distortion upon recording of the main information signal which is performed by the rotary heads 29 and 30, even due to remanence made in the magnetic tape 31 by the recording of the control signal.

As the magnetic tape 31 recorded with signals passes by the fixed head 100, a recorded signal part RS is erased by the fixed head 100, and the control signal CS is recorded by the fixed head 100. Thereafter, as the magnetic tape 31 makes contact with and slides against the guide drum 103, the video and audio signals are band-multiplexed and alternately recorded on the tracks t1, t2, t3, ... which are oblique with respect to the longitudinal direction of the magnetic tape 31 by the heads 29 and 30 provided on the rotating rotary drum 103a, as described above.

Since the frequency of the above control signal CS is low, the control signal is recorded not only on the surface of the magnetic layer, but also to a deep portion of the magnetic layer of the magnetic tape 31. Accordingly, even when a part of the control signal is erased by the erasing action of the frequency-modulated signal recorded by the rotary heads 29 and 30 throughout the full width of the magnetic tape 31 where the control signal CS is recorded, only a part of the signal recorded at the surface part of the magnetic layer is erased. Thus, the control signal remains recorded as remanence at the deep portion of the magnetic layer in the magnetic tape 31. Therefore, the control signal can be finely reproduced by the fixed head 100 upon reproduction.

Figure 15:
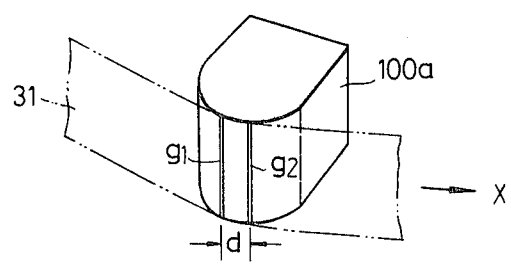
FIG. 15 is a perspective view showing an embodiment of an erasing head unitarily assembled with a control head, used in the recording and/or reproducing apparatus according to the present invention.

Description was given above for the case where the fixed head 100 is of the single-gap type. However a double-gap type head having a larger erasing capability can be used for the fixed head 100. FIG. 15 shows a fixed head 100a of a double-gap type, having two gaps g1 and g2. However, in the apparatus according to the present invention, the fixed head 100a must not only perform erasure, but also record the control signal. Hence, unless there is a specific relationship between the distance between the two gaps g1 and g2 with respect to the recording wavelength of the control signal on the magnetic tape, the control signal cannot be finely reproduced upon reproduction. This will now be explained. There are two kinds of double-gap type heads. In one kind of the double-gap type head, the reproducing polarity of the two gaps are the same. On the other hand, in another kind of the double-gap type head, the reproducing polarity of the two gaps are mutually opposite, due to the manner with which wires are wound onto the core.

In the type where the reproducing polarity of the gaps g1 and g2 are the same, a distance d between the gaps can be defined as follows, where n is an integer, V is the travelling speed of the magnetic tape 31, and f is the frequency of the control signal.

$$d = (n \cdot v)/f$$

On the other hand, in the type where the reproducing polarity of the two gaps g1 and g2 are mutually opposite, the distance d between the gaps can be defined as follows.

$$d = [(2n+1) V]/2f$$

During the recording mode, the erasure is performed by the gap g1. The control signal recorded by the gap g1 due to leakage flux, is erased when the regular control signal is recorded by the gap g2. During the reproducing mode, the added output of the reproduced outputs obtained from the two gaps g1 and g2, is obtained as the reproduced output. Further, if the width of the two gaps g1 and g2 are set to different values to give a different sensitivity, it is possible to separate and obtain either one of the outputs of the gaps g1 and g2.

When the recording level of the control signal is high, distortion may be introduced in the signal components particularly in the low frequency range within the signal recorded onto the magnetic tape 31 by the heads 29 and 30. In such a case, difference in the color density and unwanted noise components may appear in the reproduced picture as interference due to the above distortion. However, since the phase of the interfering signal in the reproduced picture reverses for every one horizontal scanning line, measures may be taken so that the interference is not highly visible in the reproduced picture. That is, if the ratio between the linear speeds of the fixed head 100 and the rotary heads 29 and 30 are selected so that the repetition frequency of the above interference signal has an interleaving relationship with respect to the video signal, the interference will not be highly noticeable in the reproduced picture. If the frequency of the control signal is 30 Hz and the video signal is of the NTSC system, for example, the above measures will be realized by setting the linear speed of the rotary heads 29 and 30 to a value 262.5 times the linear speed of the fixed head 100.

Figure 16:
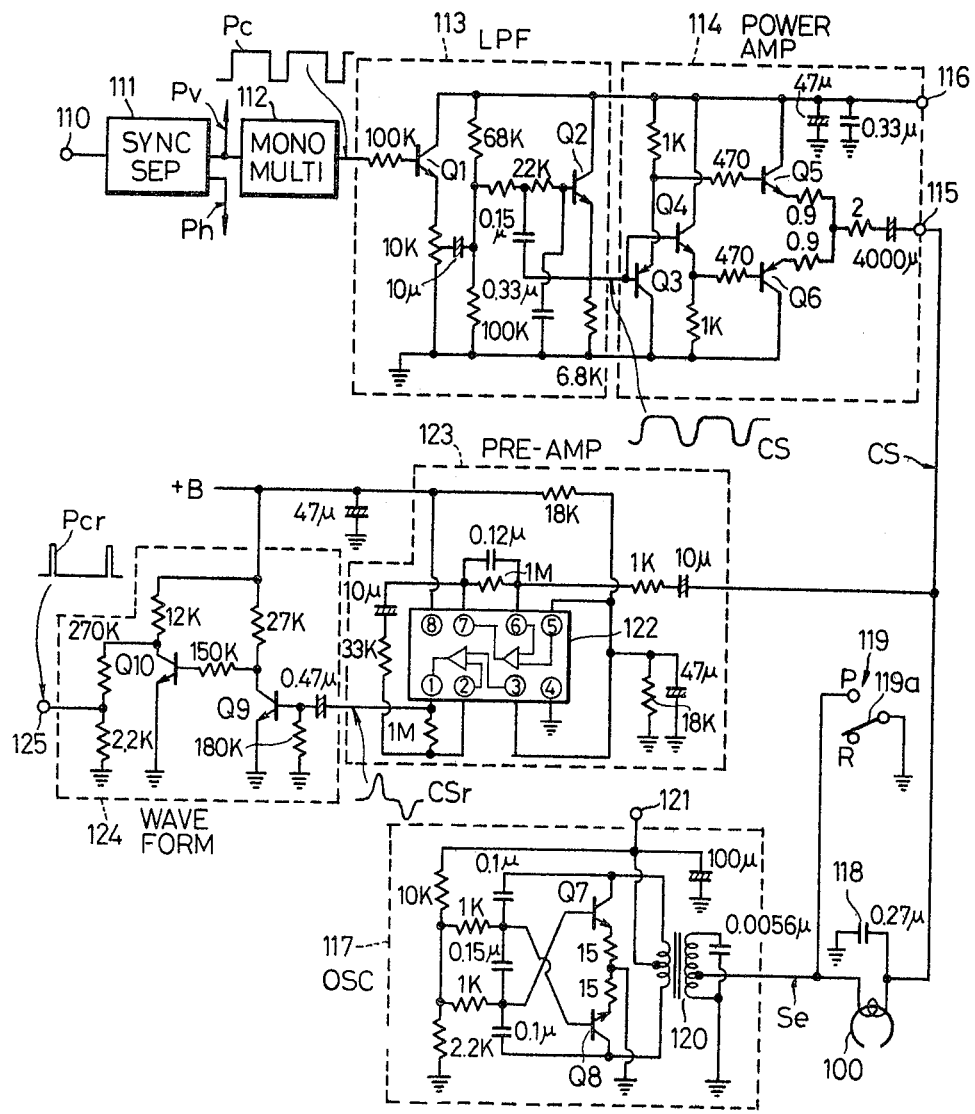
FIG. 16 is a circuit diagram showing an embodiment of a circuit for producing an erasing signal and a control signal which are applied to an erasing head.

Description will now be given with respect to an embodiment of a circuit in the recording and reproducing system for the control signal, by referring to FIG. 16. The video signal obtained through an input terminal 110, is supplied to a synchronizing signal separation circuit 111 wherein a horizontal synchronizing signal Ph and a vertical synchronizing signal Pv are separated. The vertical synchronizing signal Pv is supplied to a monostable multivibrator 112.

The monostable multivibrator 112 produces a signal Pc having a repetition period of 1/30 second. The produced signal is supplied to a lowpass filter 113 constructed from transistors Q1 and Q2, resistors, and capacitors. In the example shown in FIG. 16, the lowpass filter 113 has a characteristic which indicates −3 dB at a frequency of 100 Hz. An output signal Sc of the lowpass filter 113, is eliminated of the high-frequency component, because the input signal Pc in the form of a square wave passes through the lowpass filter 113 having a cutoff frequency of 100 Hz. The output signal Sc accordingly does not introduce distortion upon recording of the main information signal. This signal is used as the control signal CS.

The control signal CS is amplified at a voltage amplifier 114 constructed from transistors Q3 through Q6, resistors, and capacitors, and supplied to one terminal of the fixed head 100 through an output terminal 115. An operating voltage is applied to a terminal 116 of the voltage amplifier 114 only during recording.

A high-frequency current Se for erasing having a frequency of 70 kHz, for example, is supplied to the other terminal of the fixed head 100 from an oscillator 117. The impedance of a capacitor 118 connected between one terminal of the fixed head 100 and ground, is substantially zero at the frequency of the high-frequency current Se for erasure. Moreover, at the frequency of the control signal Cs, this capacitor 118 has a substabtially high impedance compared to the impedance of the fixed head 100.

A switch 119 is connect to one terminal of the fixed head 100. A movable contact 119a of the switch 119, is connected to the side of the contact point P during reproduction, and connected to the side of the contact point R upon recording. This switch 119 may be omitted, if measures are taken so that the signals CS and Se are not applied to the fixed head 100 upon reproduction.

During the recording mode, the control signal CS is grounded through the fixed head 100 and a part of a secondary winding 120 of an output transformer in the oscillator 117. In addition, the high-frequency current Se for erasure is grounded through the fixed head 100 and the capacitor 118. The control signal current and the high-frequency current for erasure are multiplexed, and supplied to the fixed head 100. The oscillator 177 is constructed from transistors Q7 and Q8, the output transformer, resistors, and capacitors. This oscillator 117 is cut off from being supplied with an operational voltage through a terminal 121 upon reproduction.

A control signal CSr reproduced by the fixed head 100 upon reproduction mode, is amplifier at a preamplifier 123 constructed from an operational amplifier 122, resistors, and capacitors. The amplified control signal is supplied to a waveform shaping circuit 124 constructed from transistors Q9 and Q10, resistors, and capacitors. A reproduced control signal Pcr of a square waveform, is produced by the waveform shaping circuit 124 and obtained through an output terminal 125.

It is not essential for the control signal CS to be recorded throughout the full width of the magnetic tape 31. For example, the control signal may be recorded throughout half the width of the magnetic tape. If there is a region in the magnetic tape where the video signal, the audio signal, and the control signal are all recorded as a result of recording, this is within the scope of the present invention. Moreover, the video, audio, and control signals may be recorded in the manner described above, and an audio signal track may be further provided on the end edge of the magnetic tape as in the conventional apparatus. In this case, this extra audio signal track may be used after normal recording is completed.

Further, the present invention is not limited to these embodiments, but various variations and modifications may be made without departing from the scope of the present invention.

What is claimed is:

1. A magnetic recording apparatus comprising:
    a first input terminal for receiving a color video signal;
    a second input terminal for receiving an audio signal;
    separating means coupled to said first input terminal, for separating said color video signal into a luminance signal and a carrier chrominance signal;
    frequency modulating means responsive to said separating means for frequency-modulating the luminance signal;
    frequency converting means responsive to said separating means for frequency-converting the separated carrier chrominance signal;
    delay means coupled to said second input terminal for delaying said audio signal by a predetermined delay time;
    means responsive to said delay means for frequency-modulating the delayed audio signal so that said audio signal is in a frequency band between the output frequency modulated luminance signal of said frequency modulating means and the output frequency converted carrier chrominance signal of said frequency converting means;
    means for multiplexing said audio signal from said second input terminal and the delayed audio signal from said delay means and for producing a multiplexed audio signal for recording;
    multiplexing means for multiplexing said frequency modulated luminance signal, said frequency converted carrier chrominance signal, and said multiplexed audio signal and for producing a first multiplexed recording signal;
    fixed head recording means for recording a control signal in a track with a predetermined width on a magnetic tape; and
    rotary head recording means for recording said first multiplexed recording signal from said multiplexing means over a control signal previously recorded by at least one of said rotary head recording means, so that said first multiplexed recording signal is superimposed on said previously recorded control signal in predetermined areas on the magnetic tape.

2. A magnetic recording apparatus as claimed in claim 1 in which said fixed head recording means records said control signal over approximately the full width of the magnetic tape.

3. A magnetic recording apparatus as claimed in claim 1 in which said multiplexing means also produces a second multiplexed recording signal in which said frequency modulated luminance signal and said frequency converted carrier chrominance signal are multiplexed, and said rotary head recording means comprises a first rotary head for recording said first multiplexed recording signal on said magnetic tape during a first specific time period and a second rotary head for recording said second multiplexed recording signal on said magnetic tape during a second specific time period which is subsequent to said first specific time period.

4. A magnetic recording apparatus as claimed in claim 1 in which said rotary head recording means comprises a single rotary head for recording said first multiplexed recording signal on said magnetic tape.

5. A magnetic recording and reproducing apparatus comprising:
    a first input terminal for receiving a color video signal;
    a second input terminal for receiving an audio signal;
    first separating means coupled to said first input terminal for separating said color video signal into a luminance signal and a carrier chrominance signal;
    frequency modulating means responsive to said first separating means for frequency-modulating the separated luminance signal;
    frequency converting means responsive to said first separating means for frequency-converting the separated carrier chrominance signal;
    first delay means coupled to said second input terminal for delaying said audio signal by a predetermined delay time;

means for frequency-modulating the delayed audio signal from said first delay means so that said audio signal is converted into a frequency band between the output frequency modulated luminance signal of said frequency modulating means and the output frequency of the converted carrier chrominance signal of said frequency converting means;

means for multiplexing the undelayed audio signal from said second input terminal and the delayed audio signal from said first delay means and for producing a multiplexed audio signal for recording;

multiplexing means for multiplexing said frequency modulated luminance signal, said frequency converted carrier chrominance signal, and said multiplexed audio signal, and for producing a first multiplexed recording signal;

fixed head recording and reproducing means for recording a control signal in a track with a predetermined width on a magnetic tape during a recording mode of said apparatus, and for reproducing a previously recorded control signal from the magnetic tape during a reproducing mode of said apparatus;

rotary head recording and reproducing means responsive to said multiplexing means for recording said first multiplexed recording signal over the previously recorded control signal so that during the recording mode said first multiplexed recording signal is superimposed on the previously recorded control signal in predetermined areas on the magnetic tape, and for reproducing said first multiplexed recording signal from the magnetic tape during the reproducing mode;

second separating means for separating said frequency modulated luminance signal and said frequency converted carrier chrominance signal from a signal which is reproduced by said rotary head recording and reproducing means;

video signal obtaining means responsive to said second separating means for obtaining a reproduced color video signal from the separated frequency modulated luminance signal and the separated frequency converted carrier chrominance signal;

a first output terminal for producing said reproduced color video signal from said video signal obtaining means;

third separating means responsive to the signal which is reproduced by said rotary head recording and reproducing means for separating the undelayed audio signal and the delayed audio signal within said multiplexed audio signal;

second delay means responsive to said third separating means for delaying the separated undelayed audio signal by a delay time which is equal to said predetermined delay time of said first delay means;

switching means for alternately producing the separated delayed audio signal from said third separating means and the delayed audio signal from said second delay means to produce a continuously reproduced audio signal; and a second output terminal for producing the continuous reproduced audio signal from said switching means, said control signal having a frequency such that the control signal reproduced by said rotary heads has a frequency which is lower than a frequency band of said frequency converted carrier chrominance signal.

6. A magnetic recording and reproducing apparatus as claimed in claim 5 in which said fixed head recording and reproducing means records said control signal over a track covering approximately the full width of the magnetic tape.

7. A magnetic recording and reproducing apparatus as claimed in claim 5 in which said multiplexing means also produces a second multiplexed recording signal in which said frequency modulated luminance signal and said frequency converted carrier chrominance signal are multiplexed, and said rotary head recording and reproducing means comprises a first rotary head for recording and reproducing said first multiplexed recording signal on and from said magnetic tape during a first specific time period and a second rotary head for recording and reproducing said second multiplexed recording signal on and from said magnetic tape during a second specific time period which is subsequent to said first specific time period.

8. A magnetic recording and reproducing apparatus as claimed in claim 7 which further comprises means responsive to a switching signal for switching and supplying to said second and third separating means the signal reproduced by said first rotary head during the first specific time period and for supplying to said second and third separating means the signal reproduced by said second rotary head during said second specific time period.

9. A magnetic recording and reproducing apparatus as claimed in claim 5 in which said rotary head recording and reproducing means comprises a single rotary head for recording and reproducing said first multiplexed recording signal on and from said magnetic tape.

* * * * *